United States Patent
Patwardhan et al.

(10) Patent No.: US 11,188,747 B2
(45) Date of Patent: Nov. 30, 2021

(54) SYSTEM AND METHOD FOR MASKING TEXT WITHIN IMAGES

(71) Applicant: Tata Consultancy Services Limited, Mumbai (IN)

(72) Inventors: Nikhil Patwardhan, Pune (IN); Pranit Reke, Pune (IN); Prachi Shastri, Pune (IN); Rupali Kulkarni, Pune (IN); Shraddha Kapse, Pune (IN); Ankit Jagtap, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 0 days.

(21) Appl. No.: 16/948,365

(22) Filed: Sep. 15, 2020

(65) Prior Publication Data

US 2021/0097273 A1    Apr. 1, 2021

(30) Foreign Application Priority Data

Sep. 30, 2019  (IN) .............................. 201921039439

(51) Int. Cl.
*G06K 9/00*     (2006.01)
*G06K 9/20*     (2006.01)
(Continued)

(52) U.S. Cl.
CPC ..... *G06K 9/00463* (2013.01); *G06F 21/6254* (2013.01); *G06K 9/2063* (2013.01);
(Continued)

(58) Field of Classification Search
CPC ............. G06K 9/00463; G06K 9/2063; G06K 9/3283; G06K 2209/01; G06K 9/2054;
(Continued)

(56) References Cited

U.S. PATENT DOCUMENTS 10,872,236 B1 *  12/2020  Elor ...................... G06K 9/2072
2005/0183002 A1 *   8/2005  Chapus ................... G06F 16/80
715/223

(Continued)

FOREIGN PATENT DOCUMENTS

JP          5661549 B2    1/2015
KR        101585029 B1    1/2016
WO    WO2018/183130 A1   10/2018

OTHER PUBLICATIONS

Harraj, Abdeslam EL et al., "OCR Accuracy Improvement on Document Images Through a Novel Pre-Processing Approach", Signal & Image Processing: An International Journal (SIPIJ), 2015, vol. 6, No. 4, Research Gate https://www.researchgate.net/publication/281768819_OCR_Accuracy_Improvement_on_Document_Images_Through_a_Novel_Pre-Processing_Approach/link/55fa092008aeba1d9f281e4d/download.

*Primary Examiner* — Ming Y Hon
(74) *Attorney, Agent, or Firm* — Finnegan, Henderson, Farabow, Garrett & Dunner, LLP

(57) ABSTRACT

This disclosure relates generally to a system and method for masking text within images. Conventionally, image masking approaches have enabled masking but masking PII data which contains sensitive data is still a challenge. The present disclosure includes training and masking phase, wherein during training phase the PII label and values of the input image are captured and stored as co-ordinates in the database. During masking, the test image and the words comprised in the test image are optimized using an OCR technique. The label and value of each pairs are compared with the words comprised in the optimized test image. The comparison results in one or more matching labels and then a masking area is calculated for each matching label. The masking string is generated for each matching label based on (Continued)

the calculated masking area and the original text is masked with the generated string.

12 Claims, 15 Drawing Sheets

(51) Int. Cl.
  *G06K 9/32* (2006.01)
  *G06T 3/40* (2006.01)
  *G06F 21/62* (2013.01)
(52) U.S. Cl.
  CPC .............. *G06K 9/3283* (2013.01); *G06T 3/40* (2013.01); *G06K 2209/01* (2013.01)
(58) Field of Classification Search
  CPC ........ G06K 9/32; G06K 9/72; G06K 9/00442; G06F 21/6254; G06T 3/40
  See application file for complete search history.

(56) References Cited

U.S. PATENT DOCUMENTS

| | | | |
|---|---|---|---|
| 2013/0238965 A1* | 9/2013 | Barrus | G06K 9/00449 715/223 |
| 2020/0050845 A1* | 2/2020 | Foncubierta Rodriguez | G06K 9/00456 |
| 2020/0097713 A1* | 3/2020 | Cramer | G06K 9/00449 |

* cited by examiner

College Application

Name

John     Doe
First    Last

Address

210, XYZ Road , CMZ

Address

Address

City                State / Province / Region

Postal / Zip Code   Country

Phone   3876593563

\###   \###   \####

Name

John    Doe

FIG. 4A

College Application

Name

| John | Doe |
| First | Last |

Address

| 210, XYZ Road , CMZ |

Address

| |

Address

| | | |
| City | | State / Province / Region |

| | | |
| Postal / Zip Code | | Country |

Phone 3876593563

| ### | ### | #### |

Name

| John | Doe |

FIG. 4B

College Application

Name

John    Doe

First    Last

Address

| 210, XYZ Road , CMZ |

Address

|  |

Address

|  |      |  |

City    State / Province / Region

|  |      |  |

Postal / Zip Code    Country

Phone   3876593563

|  | - |  | - |  |

College Application

Name
XXXXXXXX
First          Last

Address
| 210, XYZ Road , CMZ |

Address
| |

Address
| |                    | |
City                   State / Province / Region

| |                    | ▾ |
Postal / Zip Code      Country

Phone   3876593563
| | - | | - | |
 ###    ###    ####

FIG. 5B

College Application

Name

John     Doe

First     Last

Address

| 210, XYZ Road , CMZ |

Address

| |

Address

| |     | |

City                        State / Province / Region

| |     | ▼ |

Postal / Zip Code      Country

Phone   3876593563     Name

| | - | | - | |     John Doe

###      ####

NAME

John Doe

FIG. 5C

College Application

Name

XXXXXXXX

First      Last

Address

| 210, XYZ Road , CMZ. |

Address

|  |

Address

|  |   |  |
City      State / Province / Region

|  |   |  |
Postal / Zip Code   Country

Phone  3876593563   Name

|   | - |   | - |   |        XXXXXXXX
 \#\#\#    \#\#\#    \#\#\#\#

NAME

XXXXXXXX

College Application

Name

John      Doe
First     Last

Address

| 210, XYZ Road , CMZ. |

Address

| |

Address

| |     | |
City      State / Province / Region

| |     | ▼ |
Postal / Zip Code    Country

Phone 3876593563    Name

[   ] - [   ] - [    ]    John Doe
 ###    ###    ####

NAME

John Doe

FIG. 5E

College Application

Name
XXXXXXX
First    Last

Address
| 210, XYZ Road , CMZ |

Address
| |

Address
| |                    | |
City                    State / Province / Region

| |                    | |
Postal / Zip Code       Country

Phone  3876593563    Name
[ ] - [ ] - [ ]          XXXXXXXX
 ###   ###   ####
NAME
XXXXXXX

FIG. 5F

Annual Leave/Vacation Request Form

| Name<br>John Doe | | Date<br>27/06/2014 |
|---|---|---|
| Vacation Request Start Date | Return to Work Date | Total Work Days Off |
| Signature | | Date |

*If your department permits this form to be emailed for approval, your @emich.edu email is your signature.*

This Vacation Request is: ☐ Granted  ☐ Denied

Reason:

| Name (Supervisor)<br>ABC XYZ wabcd | Date |
|---|---|

** *Electronic approval permitted at supervisory level.*

Please follow your department's procedures for requesting time off. Vacation/ Annual Leave should be requested at least five days in advance. Supervisors are to keep the form on file in accordance with the department's procedures.

Important notice for employees with less than one year of service: You must complete the "Request to Use Annual Leave" form at this [link] and return it to the Payroll Office prior to taking annual leave/vacation. For questions, please contact Payroll at 734-487-2393 or via email at payroll.questions@emich.edu.

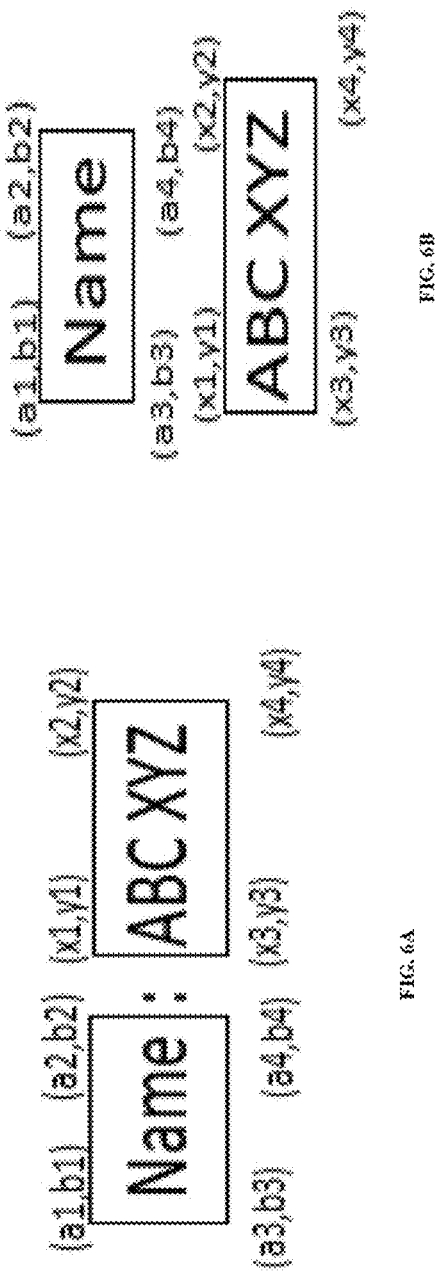

SYSTEM AND METHOD FOR MASKING TEXT WITHIN IMAGES

PRIORITY CLAIM

This U.S. patent application claims priority under 35 U.S.C. § 119 to: India Application No. 201921039439, filed on Sep. 30, 2019. The entire contents of the aforementioned application are incorporated herein by reference.

TECHNICAL FIELD

This disclosure relates generally to field of image processing, and more particularly to system and method for masking text within images.

BACKGROUND

Optical character recognition or optical character reader (OCR) is a mechanical or electronic conversion of images of typed, handwritten or printed text into machine-encoded text, whether from a scanned document, a photo of a document, a scene-photo or from subtitle text superimposed on an image. OCR is used as a form of information entry from printed paper data records—whether passport documents, invoices, bank statements, computerized receipts, business cards, mail, printouts of static-data, or any suitable documentation.

Currently, images which hold sensitive information are stored in organization as they are, and these images are copied in number of environments. Access to sensitive data, typically Personally Identifiable information (PII), by unauthorized person violates data privacy regulation. Thus, identifying PII related text present in images, and masking it suitably has become an important ask from number of organizations. However, it is difficult to identify PII and then mask text corresponding to PII within images. OCR technique which is still on its maturity path can extract text from image, but identifying exact location of PII data within image, and modifying the image such that PII data is masked is still a challenge. Documents from banking, insurance, healthcare and similar domains that handle documents with PII need to be masked. For example, PII on images of cheque need to be masked, in insurance domain, PII on scanned policy documents needs to be masked. Similarly, in health care domain PII on laboratory test reports need to be masked.

Conventionally, image masking has many known approaches that enable masking or blurring specific identified parts of an image. Generally, by applying filters to existing image or a photograph such solutions are not effective for text masking. Further, existing text masking solutions mask text within image, but have limitations while been applied in bulk mode. In addition, these conventional approaches require lot of manual activity, and are able to mask only given image.

SUMMARY

Embodiments of the present disclosure present technological improvements as solutions to one or more of the above-mentioned technical problems recognized by the inventors in conventional systems. For example, in one embodiment, a processor implemented method for masking text within images. The method comprises obtaining, via one or more hardware processors, receiving, via a masking system, an input image specific to an application form, wherein the input image indicates one or more headers and corresponding fields; training the input image by obtaining an input comprising one or more pairs of a label and a corresponding value, each of the one or more pairs of the label and the corresponding value serve as coordinates and storing the trained image along with the coordinates in a database; calculating (i) a relative distance (RD) between the label and the corresponding value for each of the one or more pairs, and (ii) a direction of the corresponding value with respect to the label, using the coordinates; receiving a test image specific to a test application form; performing an optimization technique on the test image to obtain an optimized test image; performing an optical character recognition technique on the optimized image to identify one or more words comprised in the optimized test image; performing a comparison of (i) the label of each of the one or more pairs with (ii) one or more words comprised in the text image to obtain one or more matching labels of the optimized test image; calculating a masking area of each of the one or more matching labels using the calculated relative distance and the calculated direction; generating a corresponding masking string for the corresponding values of each of the one or more matching labels using the calculated masking area; and masking an original area of the corresponding value of each of the one or more matching labels with the corresponding generated masking string to obtain a masked test image.

In another aspect, there is provided a system for masking text within images. The system comprises: a memory storing instructions; one or more communication interfaces; and one or more hardware processors coupled to the memory via the one or more communication interfaces, wherein the one or more hardware processors are configured by the instructions to: receive, via a masking system, an input image specific to an application form, wherein the input image indicates one or more headers and corresponding fields. The system further comprises training the input image by obtaining an input comprising one or more pairs of a label and a corresponding value, each of the one or more pairs of the label and the corresponding value serve as coordinates and storing the trained image along with the coordinates in a database. Calculating (i) a relative distance (RD) between the label and the corresponding value for each of the one or more pairs, and (ii) a direction of the corresponding value with respect to the label, using the coordinates; receiving a test image specific to a test application form; performing an optimization technique on the test image to obtain an optimized test image; performing an optical character recognition technique on the optimized image to identify one or more words comprised in the optimized test image; performing a comparison of (i) the label of each of the one or more pairs with (ii) one or more words comprised in the text image to obtain one or more matching labels of the optimized test image; calculating a masking area of each of the one or more matching labels using the calculated relative distance and the calculated direction; generating a corresponding masking string for the corresponding values of each of the one or more matching labels using the calculated masking area; and masking an original area of the corresponding value of each of the one or more matching labels with the corresponding generated masking string to obtain a masked test image.

In yet another aspect, there are provided one or more non-transitory machine-readable information storage mediums comprising one or more instructions which when executed by one or more hardware processors cause receiving, via a masking system, an input image specific to an application form, wherein the input image indicates one or more headers and corresponding fields; training the input image by obtaining an input comprising one or more pairs of a label and a corresponding value, each of the one or more pairs of the label and the corresponding value serve as coordinates and storing the trained image along with the coordinates in a database. The instructions further cause calculating (i) a relative distance (RD) between the label and the corresponding value for each of the one or more pairs, and (ii) a direction of the corresponding value with respect to the label, using the coordinates; receiving a test image specific to a test application form; performing an optimization technique on the test image to obtain an optimized test image; performing an optical character recognition technique on the optimized image to identify one or more words comprised in the optimized test image; performing a comparison of (i) the label of each of the one or more pairs with (ii) one or more words comprised in the text image to obtain one or more matching labels of the optimized test image; calculating a masking area of each of the one or more matching labels using the calculated relative distance and the calculated direction; generating a corresponding masking string for the corresponding values of each of the one or more matching labels using the calculated masking area; and masking an original area of the corresponding value of each of the one or more matching labels with the corresponding generated masking string to obtain a masked test image.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIGS. 4A and 4B are use case examples depicting user interface for image training module for masking text within images, in accordance with some embodiments of the present disclosure.

FIGS. 5A through 5H illustrate a use case of masking text within images, in accordance with some embodiments of the present disclosure.

FIG. 6A and FIG. 6B illustrate use cases for calculating a relative distance and direction between a Personally Identifiable information (PII) label and a PII value, in accordance with some embodiments of the present disclosure.

DETAILED DESCRIPTION

Figure 1:
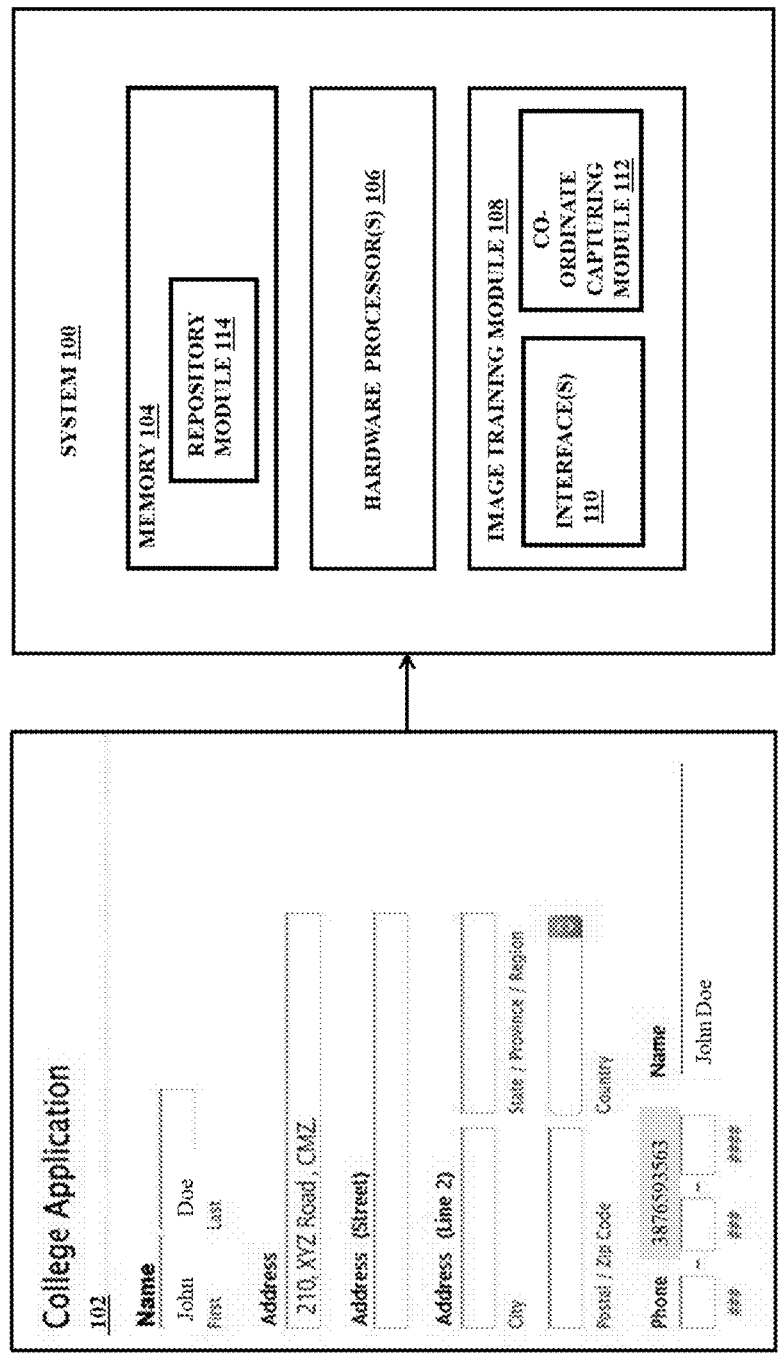
FIG. 1 illustrates an exemplary system, trained with a training image, for masking text within images, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

The embodiments herein provide a system and method for masking text within images. The present disclosure utilizes training images to train a system for identifying Personally Identifiable information (PII) label and PII value. Once trained using training image the present system enables masking any input equivalent images. Masking requirements may come from different domains including banking, insurance, and healthcare, in case of banks, cheque images may be needed to be masked, where in case of insurance, scanned policy documents needs to be masked and further in case of health care, laboratory test application form may be needed to be masked. The present method enables identifying location of PII within the input image based on the PII label and the PII value and automatically masking the identified PII.

Referring now to the drawings, and more particularly to FIG. 1 through FIG. 6B, where similar reference characters denote corresponding features consistently throughout the figures, there are shown preferred embodiments and these embodiments are described in the context of the following exemplary system and/or method.

FIG. 1 illustrates an exemplary system (100), trained with a training image, for masking text within images (e.g., test images), in accordance with some embodiments of the present disclosure. In an embodiment, the system 100 is trained using an image of a college application 102. Modules of the system 100 used for training are depicted in FIG. 1. In an embodiment, the system 100 includes one or more hardware processors 106, communication interface device(s) or input/output (I/O) interface(s) 110 (also referred as interface(s)), and one or more data storage devices or memory 104 operatively coupled to the one or more hardware processors 106. The one or more processors 106 may be one or more software processing components and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the system 100 can be implemented in a variety of computing systems, such as laptop computers, notebooks, hand-held devices, workstations, mainframe computers, servers, a network cloud and the like.

The I/O interface device(s) 110 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 104 may include any computer-readable medium known in the art including, for example, volatile memory, such as static random access memory (SRAM) and dynamic random access memory (DRAM), and/or nonvolatile memory, such as read only memory (ROM), erasable programmable ROM, flash memories, hard disks, optical disks, and magnetic tapes. In an embodiment, a repository module 114 is comprised in the memory 104, wherein the repository module 114 comprises information, for example, an image training information i.e., all the captured PII (Personally identifiable information) label, its position, its position relative to value and optionally value patterns of an input image which needs to be masked.

In an embodiment, the memory 104 may store (or stores) all the training information i.e., all the PII label, its position, its position relative to value and optionally value patterns of the input image which needs to be masked. The memory 104 further comprises (or may further comprise) information pertaining to input(s)/output(s) of each step performed by the systems and methods of the present disclosure. In other words, input(s) fed at each step and output(s) generated at each step are comprised in the memory 102 and can be utilized in further processing and analysis.

Referring to the FIG. 1, the application form 102 of the system 100 includes the input image which is used for training through image training module 108 via the hardware processor 106. The input image can be any document such as a form or an application page from banking, insurance, and healthcare and/or other domains. Further, the bank documents can include cheque images that need to be masked. In insurance domain a scanned policy documents needs to be masked, similarly in case of health care, laboratory test report or applications need to be masked. The image training module 108 of the system 100 includes an interface (s) module 110 and a co-ordinate capturing module 112, which is configured to train the system 100 using the input image extracted from the college application 102. The interface(s) module 110 of the image training module 108 is configured to provide an interface to the user to define one input image (say the college application 102). Further, the interface(s) module 110 enables user to select the PII (Personally Identifiable information) label and the PII values using simple mouse hovering as depicted in FIGS. 4A and 4B. The co-ordinate capturing module 112 of the image training module 108 captures the PII label and the PII value by marking the co-ordinates using simple mouse over. Further, during training phase, the PII label, its position, its position relative to value and optionally value patterns are captured for each and every PII fields present in the image. The repository module 110 of the system 100 which is comprised in the memory 104 is configured to store all the captured training information i.e., to store all the captured the PII label, its position, its position relative to value and optionally value patterns. The present disclosure provides user an interface to create a job flow for the training image wherein job flow shows all the PII fields that got trained and user can provide masking rule of her choice for each PII field, for e.g., user can decide to mask account number by substituting it with XXXXX. Further, in job flow, folder location is taken as input which contains large volume of images that need to be masked and are very similar to the trained image (fall in the category of trained image, such as college forms). Once job flow is saved, it is executed to mask the images. Job flow for image masking is created through product wherein a user interface is provided to configure job flow, and this is existing functionality of product. Further, in job flow set of input parameters are taken wherein one such input parameter is folder location where images to be masked are present.

Figure 2:
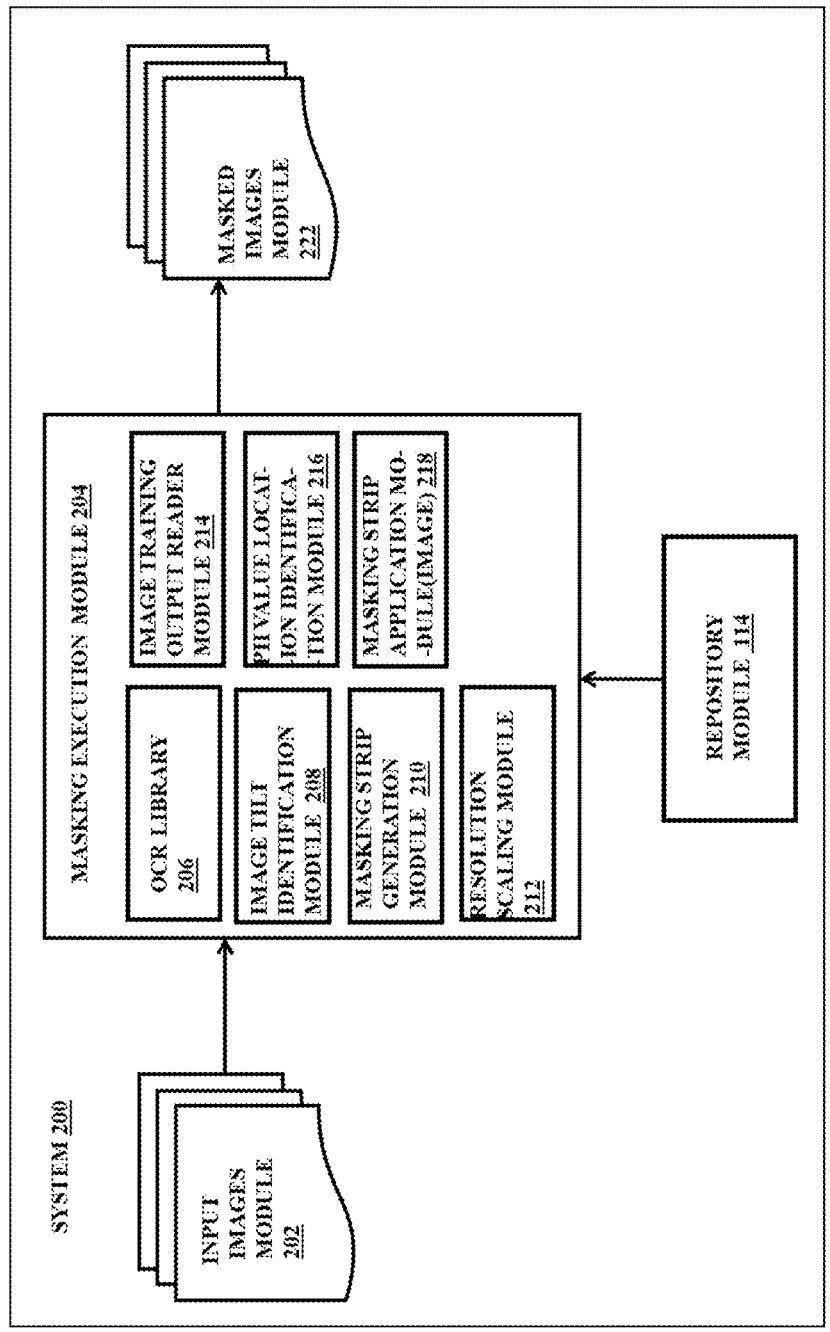
FIG. 2 illustrates an exemplary block diagram of the system during testing phase for masking text within images, in accordance with some embodiments of the present disclosure.

FIG. 2 illustrates an exemplary block diagram of the system 100 during testing phase for masking text within input images, in accordance with some embodiments of the present disclosure. In an embodiment, the modules of the system 100 utilized during testing phase, when all input scanned images are to be masked, include an input images module 202, a masking execution module 204, the repository module 220 and a masked images module 222. The masking execution module 204 of the system 200 further includes an OCR (Optical Character Recognition) Library 206, an image tilt identification module 208, a masking strip generation module 210, a resolution scaling module 212, an image training output reader module 214, a PII value location identification module 216 and a masking strip application (in image) module 218.

Referring to FIG. 2, the input images module 202 of the system 200 includes test images which are sent to the masking execution module 204 for actual masking. The test images may contain any form of application such as application form(s) related banking, insurance, and healthcare, where in case of banks, cheque images need to be masked, in case of insurance, scanned policy documents needs to be masked and further in case of health care, laboratory test application need to be masked. The masking execution module 204 is configured to receive test images from the input images module 202, and repository of co-ordinates as input from the repository module 114 and provides masked images as output. The repository module 114 of the system 200 is configured to provide all the captured and stored PII label and PII value as input to the masking execution module 204 for masking. The OCR (Optical Character Recognition) Library 206 of the masking execution module 204 uses open source tesseract library to read text from image, in one example embodiment of the present disclosure. The image tilt identification module 208 identifies tilt present in the scanned image and performs tilt correction to output an appropriate orientation of the image. The masking strip generation module 210 generates masking strip which contains masking text, based on masking technique such as substitution, randomization and the like. The resolution scaling module 212 may be executed by the system for enhancing (i) quality of image before inputting to OCR library and (ii) performance of PII library. The image training output reader module 214 includes component which reads required information from repository and keeps it ready for further consumption. The PII value location identification module 216 utilizes output from image training output reader module 216 for marking co-ordinates on input image, which includes the PII label, the PII co-ordinates, the PII value co-ordinates, relative distance between PII label co-ordinates, and PII value co-ordinates. The masking strip application (in image) module 218 overlays the original image text by XXXXX and by overlaying the value with XXXXX, the pixel values are changed such that on a white check background XXXXX appears (represented by black pixels) and the other pixels are changed to white. During masking, each test image present in the folder is picked up wherein the system applies OCR technique and text values are extracted and while extracting its co-ordinates are also captured. Further, based on the PII label captured during training, approximate location of the PII text within image is calculated and depending upon masking technique selected, masked value is generated and the generated masked value is overlaid at same location where original PII value is present. The present disclosure is able to go recursively inside folders and mask all similar images.

Figure 3A:
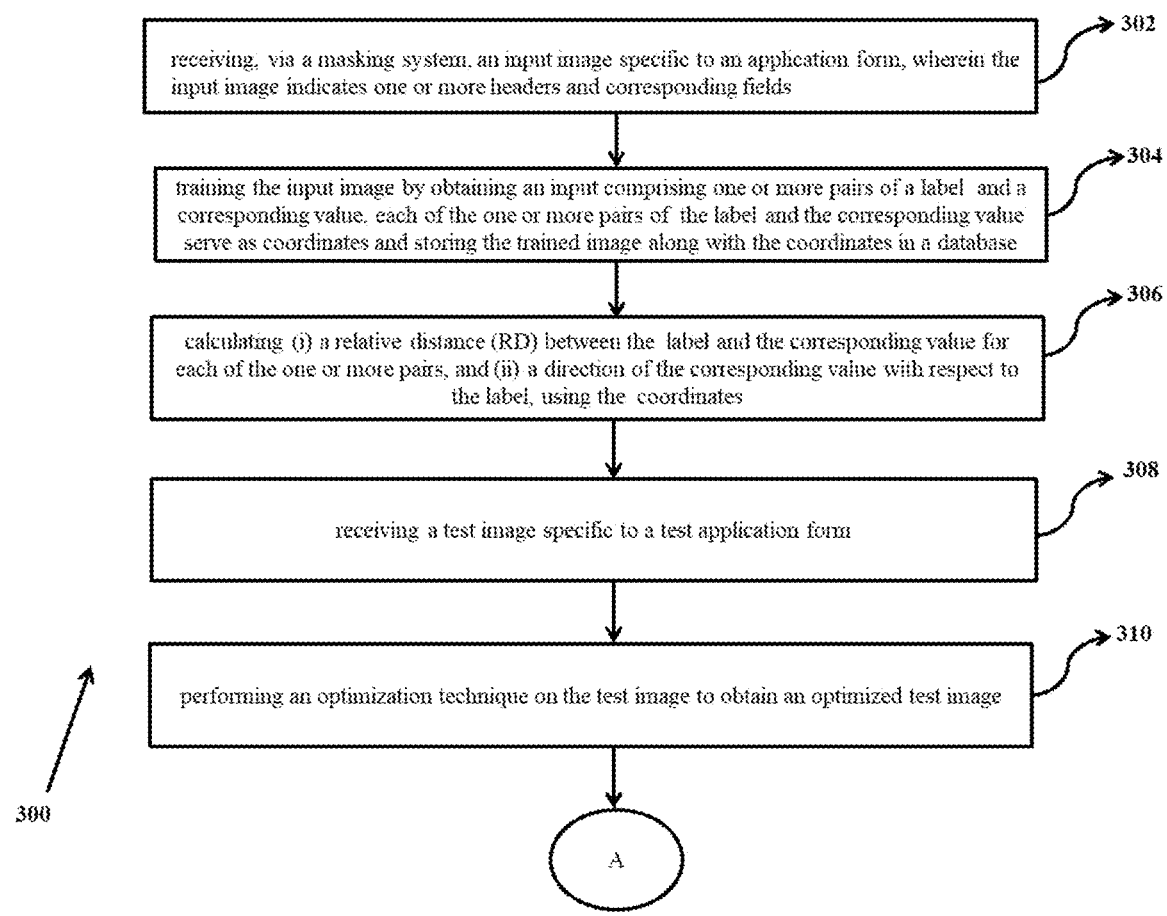
FIGS. 3A and 3B are flowcharts illustrating the steps involved in masking text within images, in accordance with some embodiments of the present disclosure.
Figure 3B:
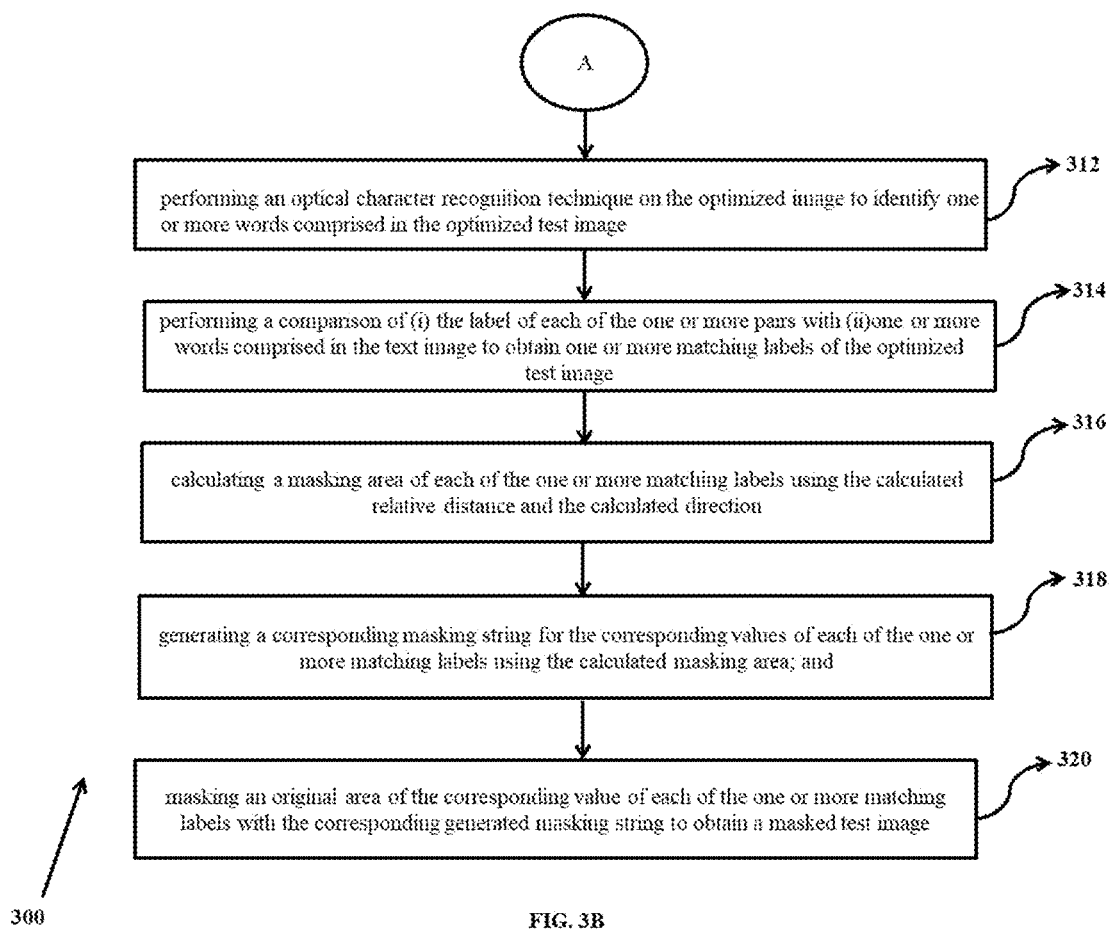

The functions of system 100 are further explained in conjunction with steps of the method 300 as depicted in flowcharts of FIGS. 3A and 3B.

FIGS. 3A and 3B are flowcharts illustrating the steps involved in masking text within images, in accordance with some embodiments of the present disclosure. Steps of the method of FIGS. 3A and 3B are performed in conjunction with modules of system 100 and 200, as explained in FIG. 1 and FIG. 2. At step 302 of the method 300, the one or more hardware processors 106 receive an input image specific to an application form via a masking system, wherein the input image indicates one or more headers (e.g., name/title, address, and the like) and corresponding fields (e.g., sections for inputting name, address details, and the like).

At step 304 of the present disclosure, the one or more hardware processors 106 train an input image by obtaining an input comprising one or more pairs of a label and a corresponding value, each of the one or more pairs of the label and the corresponding value serve as coordinates and store the trained image along with the coordinates in a database (e.g., in the memory 104 or repository module 114). In other words, each pair comprises a label and a corresponding value. Below Table 1 depicts examples of co-ordinates stored/comprised in the database.

TABLE 1

Examples of co-ordinates stored/comprised in a database.

| id | column_id | Attribute | value |
|---|---|---|---|
| 1 | 1000085 | 1000084 | label_top | 117.0 |
| 2 | 1000086 | 1000084 | backgroundColor | FFFFFF |
| 3 | 1000087 | 1000084 | label_bottom | 136.0 |
| 4 | 1000088 | 1000084 | value_top | 141.0 |
| 5 | 1000089 | 1000084 | fieldDescription | NameDesc |
| 6 | 1000090 | 1000084 | valuePattern | [0-9] |
| 7 | 1000091 | 1000084 | label_height | 19.0 |
| 8 | 1000092 | 1000084 | value_width | 187.0 |
| 9 | 1000093 | 1000084 | label_width | 75.0 |
| 10 | 1000094 | 1000084 | value_left | 28.0 |
| 11 | 1000095 | 1000084 | fontName | Times New Roman |
| 12 | 1000096 | 1000084 | label_left | 24.0 |
| 13 | 1000097 | 1000084 | value_bottom | 165.0 |

At step 306 of the method 300, the one or more hardware processors 106 calculate (i) a relative distance (RD) between the label and the corresponding value for each of the one or more pairs, and (ii) a direction of the corresponding value with respect to the label, using the coordinates.

At step 308 of the method 300, the one or more hardware processors 106 receive a test image specific to a test application form as depicted in FIG. 1. At step 310 of the method 300, the one or more hardware processors 106 perform an optimization technique on the test image to obtain an optimized test image. The optimization technique performed on the test image to obtain an optimized test image includes determining a tilt in the test image and performing a tilt correction of the test image to obtain a tilt corrected image serving as the optimized test image as depicted in FIGS. 5E through 5F. The present disclosure is able to mask every test image even though the train image (also referred as 'trained image' and may be interchangeably used herein) template is different wherein the relative distance between the PII label 'Name' and the PII value of the test image is same as the train image. Further, the optimization technique performed on the test image includes scaling the test image or the tilt corrected image to a predefined resolution to obtain the optimized test image. At step 312 of the method 300, the one or more hardware processors 106 perform an optical character recognition technique on the optimized image (also referred as optimized test image and may be interchangeably used herein) to identify one or more words comprised in the optimized test image. At step 314 of the method 300, the one or more hardware processors 106 perform a comparison of (i) the label of each of the one or more pairs with one or more words comprised in the text image to obtain one or more matching labels of the optimized test image.

At step 316 of the method 300, the one or more hardware processors 106 calculate a masking area of each of the one or more matching labels using the calculated relative distance and the calculated direction as depicted in FIGS. 6A and 6B. More specifically, FIGS. 6A and 6B depicts calculation of relative distance and direction with respect to the PII label. At step 318 of the method 300, the one or more hardware processors 106 generate a corresponding masking string for the corresponding values of each of the one or more matching labels using the calculated masking area. The generation of masking string is depicted in FIGS. 5A through 5H. At step 320 of the method 300, the one or more hardware processors 106 mask an original area of the corresponding value of each of the one or more matching labels with the corresponding generated masking string to obtain a masked test image as depicted in FIGS. 5A through 5D.

FIGS. 4A and 4B are use case examples depicting user interface for image training module 204 masking text within images, in accordance with some embodiments of the present disclosure. Referring to FIG. 4A, select label option is used to capture the PII Label 'Name', and Select Value is used to capture the PII Value. The PII label and the PII value are captured by marking the corresponding X, Y co-ordinates using simple mouse over and co-ordinates are stored in the repository module 114 which is used in the future for masking. The present disclosure has the advantage of identifying and masking the PII value, even though input images do not exactly match the input image. Referring to FIG. 4B, the 'name' PII label is on left side corner, and the value is placed below it, for example 'John Doe'. Further, in case during actual masking, the input image is encountered with the name label in the center and the value just below label, still the system is able to identify and mask the PII value.

Figure 5D:
Figure 5H:
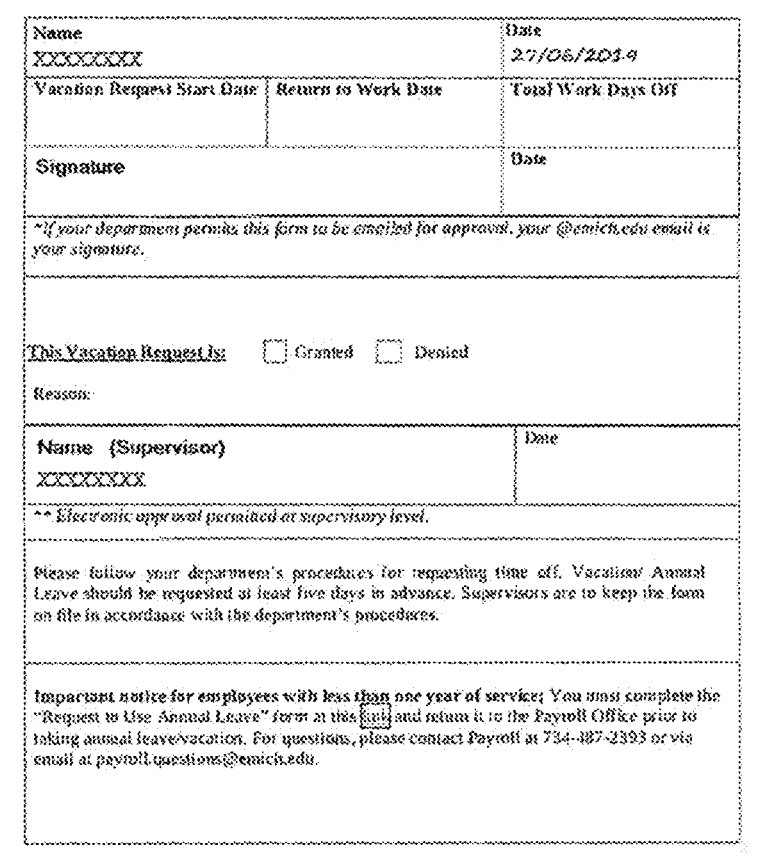

FIGS. 5A through 5H, with reference to FIGS. 1 through 4B, illustrate a use case for masking text within images, in accordance with some embodiments of the present disclosure. Referring to FIG. 5A and FIG. 5B, the name "John doe" is masked and the name is replaced with XXXXXXXX in the application form. Further, referring to FIG. 5C and FIG. 5D, the name "John doe" is masked and the name is replaced with XXXXXXXX in all the places in the application form wherever the name is present. As the present disclosure is able to mask the PII value based on relative co-ordinate distance, it is able to mask the PII value which is handwritten. Referring to FIG. 5E and FIG. 5F, the name "John doe" is masked and the name is replaced with XXXXXXXX in all the places in the application form wherever name is present even when the application form is tilted. Referring to FIG. 5G and FIG. 5H, the name "John doe" is masked and the name is replaced with XXXXXXXX in all the places in the application form wherever name is present even when the application form is tilted and the application form's format is different compared to the input image.

FIGS. 6A and 6B illustrate the use cases for calculating a relative distance and direction between a PII label and a PII value and calculating masking area using the calculated relative distance and direction, in accordance with some embodiments of the present disclosure. In an embodiment, direction is the relative location of the PII value with respect to the PII label. Accordingly, depending upon the positions of the PII value with respective to the PII label, directions can be 'Top', 'Bottom', 'Left', and 'Right'.
Relative Distance:
CASE 1 (depicted by FIG. 6A)
Consider the below label-value pair along with the coordinates on image.
(a1 to a4), (b1 to b4) forms the label region rectangle marked by user.
(x1 to x4), (y1 to y4) forms the value region rectangle marked by user.
Since, value (ABC XYZ) is to the right side of the label (Name), the direction is 'Right'.
Relative Distance (RD) is the distance between label (Name) and value (ABC XYZ).
In this case, the relative distance is distance between rightmost coordinate of label rectangle and leftmost coordinate of value rectangle.
Therefore, RD=(x1−a2) OR (x3−a4)
Now, consider the below label-value pair along with the coordinates on image.
CASE 2 (depicted by FIG. 6B)
Here value (ABC XYZ) is present below the label (Name), hence the direction is 'Bottom'.
Therefore RD=(y1−b3) OR (y2−b4)
Calculating Masking Area Using Relative Distance and Direction:
While image training, below data is stored in the memory 104:
1. Relative Distance (RD)
2. Direction.
3. Value region Width (W)=(x2−x1)
4. Value region Height (H)=(y3−y1) OR (y4−y2)

While masking, when the OCR finds label 'Name' on the image, the following steps are implemented to calculate masking region (area) of value:
1. Coordinates of label anywhere on image are provided by OCR, that is, (a1 to a4), and (b1 to b4).
2. Coordinates (also referred as co-ordinates and may be interchangeably used herein) of value by doing below basic operations:

For CASE 1:
x1=a2+RD,
y1=b2,
x2=a2+RD+W,
y2=b2,
x3=a4+RD,
y3=b2+H,
x4=a4+RD+W,
y4=b2+H.
For CASE 2:
x1=a1,
y1=b3+RD,
x2=a3+W,
y2=b4+RD,
x3=a1,
y3=b3+RD+H,
x4=a1+W,
y4=b4+RD+H
wherein, 'W' refers to "Value region Width" and 'H' refers to "Value region Height" respectively.

The present disclosure describes about the approximate matching where in image training module, the PII label such as Name, the PII label co-ordinate, the PII value co-ordinate, and the relative distance between the PII label co-ordinate and the PII value co-ordinates are captured. Further, during masking, an input image is provided. The system and method of the present disclosure does text extraction from input image (or test image) using OCR wherein the OCR library provides co-ordinates of extracted text and after text is extracted, the text is matched against the PII label (such as Name). In case it matches, co-ordinates of label are noted. The PII value co-ordinates are then searched, in case the PII value is found at approximately same relative location with respect to PII label co-ordinate, where masking is applied. Hence, masking is done even though input image format does not exactly match template image wherein the present disclosure looks for only co-ordinates and not for overall format of image. The system and method of the present disclosure is able to mask data based on role of user and in real time. Consider a use case where a cheque image (or bank check or a check specific to a financial institution) is stored in a repository which needs to be viewed by two associates one having supervisor role and another having operator role. Further, this is maker-checker scenario in which 'maker' analyzes check image and reviews amount in numbers, and words, and checks whether it is matching, but, maker should not be allowed to view account holder's name, address, whereas supervisor role who is doing 'checker' activity is able to see all other details like account holder's name, address payee name. Further, when operator who does maker activity downloads document through console/repository, he/she gets to see only amount in number and words and is not able to other details in cheque. On the contrary when supervisor downloads document from a database/repository, he/she gets to see all the details in cheque. The present disclosure has integrated OCR based image masking also into the database and is invoked for execution to provide/enable role-based masking of text within image in real time (or near real time or offline wherein text images are already stored which are in the form or scanned documents/images) as described as example embodiment of the present disclosure.

The present disclosure has the advantage of not tightly coupled to type of image, even though input image and training image do not match exactly and the method of the present disclosure is still able to find out PII label and value, and mask associated data. Further, the method of the present disclosure present can mask the PII value just based on value pattern as well, without specifying, any PII label which makes the system and method of the present disclosure generic, and can be used for any type of file/image containing text for masking. In the present disclosure, tesseract library is used as an OCR library which is available in open source world and has good accuracy for English language. Further OCR library is able to take care of tilt in image, and yet able to extract data.

Hence the present disclosure provides an easy interface to train the image, as this is critical for industry scale product. In case, training is not simplified, it can become very difficult for users to train the image. Further, in the present disclosure and implementation of the system and method it was observed through experimental results and FIGS. 5A through 5H that training image and input images need not have to match 100%, however, the system was still able to mask the PII based on relative co-ordinates between PII label and value. Further, based on the tilt in the image, method of the present disclosure enables masking data such that orientation of masked text is aligned to rest of the image text.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
   receiving, via a masking system, an input image specific to an application form, wherein the input image indicates one or more headers and corresponding fields (302);
   obtaining an input comprising one or more pairs of a label and a corresponding value associated with the input image, wherein each of the one or more pairs of the label and the corresponding value serve as coordinates and storing the input image along with the coordinates in a database (304);
   calculating (i) a relative distance (RD) between the label and the corresponding value for each of the one or more pairs, and (ii) a direction of the corresponding value with respect to the label, using the coordinates (306);
   receiving a test image specific to a test application form (308);
   performing an optimization technique on the test image to obtain an optimized test image (310);
   performing an optical character recognition (OCR) technique on the optimized image to identify one or more words comprised in the optimized test image (312);
   performing a comparison of (i) the label of each of the one or more pairs with (ii) one or more words comprised in the test image to obtain one or more matching labels of the optimized test image (314);
   calculating a masking area of each of the one or more matching labels using the calculated relative distance and the calculated direction (316);
   generating a corresponding masking string for a corresponding value of each of the one or more matching labels using the calculated masking area (318); and
   masking an original area of the corresponding value of each of the one or more matching labels with the corresponding generated masking string to obtain a masked test image (320).

2. The processor implemented method of claim 1, further comprising deoptimizing the masked test image to obtain a deoptimized test image.

3. The processor implemented method of claim 2, wherein the step of deoptimizing the masked test image to obtain a deoptimized test image comprises a tilt and resolution correction of the masked test image.

4. The processor implemented method of claim 1, wherein the step of performing an optimization technique on the test image to obtain an optimized test image comprises at least one of:
   upon determining a tilt in the test image, performing a tilt correction of the test image to obtain a tilt corrected image serving as the optimized test image; and
   scaling the test image or the tilt corrected image to a predefined resolution to obtain the optimized test image.

5. A system (100), comprising:
a memory (102) storing instructions;
one or more communication interfaces (106);
one or more hardware processors (104) coupled to the memory (102) via the one or more communication interfaces (106), wherein the one or more hardware processors (104) are configured by the instructions to:
receive, via a masking system, an input image specific to an application form, wherein the input image indicates one or more headers and corresponding fields;
 obtain an input comprising one or more pairs of a label and a corresponding value associated with the input image, wherein each of the one or more pairs of the label and the corresponding value serve as coordinates and storing the input image along with the coordinates in a database comprised in the memory;
 calculate a relative distance (RD) between the label and the corresponding value for each of the one or more pairs, and a direction of the corresponding value with respect to the label, using the coordinates;
 receive a test image specific to a test application form;
 perform an optimization technique on the test image to obtain an optimized test image;
 perform an optical character recognition technique on the optimized image to identify one or more words comprised in the optimized test image;
 perform a comparison of the label of each of the one or more pairs with one or more words comprised in the text image to obtain one or more matching labels of the optimized test image;
 calculate a masking area of each of the one or more matching labels using the calculated relative distance and the calculated direction;
 generate a corresponding masking string for the corresponding values of each of the one or more matching labels using the calculated masking area; and
 mask an original area of the corresponding value of each of the one or more matching labels with the corresponding generated masking string to obtain a masked test image.

6. The system as claimed in claim 5, wherein the one or more hardware processors are further configured by the instructions to deoptimize the masked test image to obtain a deoptimized test image.

7. The system (100) as claimed in claim 6, wherein the deoptimized test image is obtained by performing a tilt and resolution correction of the masked test image.

8. The system as claimed in claim 5, wherein the optimized test image is obtained by performing at least one of:
 upon determining a tilt in the test image, performing a tilt correction of the test image to obtain a tilt corrected image serving as the optimized test image; and
 scaling the test image or the tilt corrected image to a predefined resolution to obtain the optimized test image.

9. One or more non-transitory machine readable information storage mediums comprising one or more instructions which when executed by one or more hardware processors cause:
 receiving, via a masking system, an input image specific to an application form, wherein the input image indicates one or more headers and corresponding fields (302);
 obtaining an input comprising one or more pairs of a label and a corresponding value associated with the input image, wherein each of the one or more pairs of the label and the corresponding value serve as coordinates and storing the input image along with the coordinates in a database (304);
 calculating (i) a relative distance (RD) between the label and the corresponding value for each of the one or more pairs, and (ii) a direction of the corresponding value with respect to the label, using the coordinates (306);
 receiving a test image specific to a test application form (308);
 performing an optimization technique on the test image to obtain an optimized test image (310);
 performing an optical character recognition (OCR) technique on the optimized image to identify one or more words comprised in the optimized test image (312);
 performing a comparison of (i) the label of each of the one or more pairs with (ii) one or more words comprised in the test image to obtain one or more matching labels of the optimized test image (314);
 calculating a masking area of each of the one or more matching labels using the calculated relative distance and the calculated direction (316);
 generating a corresponding masking string for a corresponding value of each of the one or more matching labels using the calculated masking area (318); and
 masking an original area of the corresponding value of each of the one or more matching labels with the corresponding generated masking string to obtain a masked test image (320).

10. The one or more non-transitory machine readable information storage mediums of claim 9, further comprising deoptimizing the masked test image to obtain a deoptimized test image.

11. The one or more non-transitory machine readable information storage mediums of claim 10, wherein the step of deoptimizing the masked test image to obtain a deoptimized test image comprises a tilt and resolution correction of the masked test image.

12. The one or more non-transitory machine readable information storage mediums of claim 9, wherein the step of performing an optimization technique on the test image to obtain an optimized test image comprises at least one of:
 upon determining a tilt in the test image, performing a tilt correction of the test image to obtain a tilt corrected image serving as the optimized test image; and
 scaling the test image or the tilt corrected image to a predefined resolution to obtain the optimized test image.

* * * * *